United States Patent [19]
Ohashi et al.

[11] Patent Number: 5,330,703
[45] Date of Patent: Jul. 19, 1994

[54] PROCESS FOR FIRING ALLOYS CONTAINING EASILY OXIDIZABLE ELEMENTS

[75] Inventors: Tsuneaki Ohashi, Ohgaki; Nobuo Tsuno, Kasugai, both of Japan

[73] Assignee: NGK Insulators, Ltd., Nagoya, Japan

[21] Appl. No.: 9,959

[22] Filed: Jan. 27, 1993

[30] Foreign Application Priority Data

Jan. 27, 1992 [JP] Japan .................................. 4-012364

[51] Int. Cl.$^5$ .............................................. B22F 1/00
[52] U.S. Cl. ..................................... 419/57; 419/59
[58] Field of Search ..................... 419/57, 58, 59, 45

[56] References Cited

U.S. PATENT DOCUMENTS

| | | | |
|---|---|---|---|
| 4,153,485 | 5/1979 | Ogata et al. | 419/56 |
| 4,579,713 | 4/1986 | Lueth | 419/58 |
| 4,990,181 | 2/1991 | Pierotti et al. | 75/246 |

FOREIGN PATENT DOCUMENTS

0038558A1 10/1981 European Pat. Off. .
WO90/02717 3/1990 PCT Int'l Appl. .

OTHER PUBLICATIONS

*Metals Handbook*, Ninth Ed., vol. 7 "Power Metallurgy", American Society for Metals, 1984, pp. 308–376.
Metals Handbook Ninth Edition, vol. 7; Powder Metallurgy, pp. 341–343.

*Primary Examiner*—Donald P. Walsh
*Assistant Examiner*—John N. Greaves
*Attorney, Agent, or Firm*—Adduci, Mastriani, Schaumberg & Schill

[57] ABSTRACT

A shaped material comprising powders of alloys containing easily oxidizable elements is fired in a hydrogen-based atmosphere containing at least one hydrocarbon gas in a total amount of 0.01–5.0 volume %. Therefore, the amount of oxides formed on the surfaces of material powder particles is reduced, and the sinterability of powder particle surfaces is improved owing to the sticking of atomic carbon thereto and thereby the mutual diffusion of powder particles becomes easy. As a result, there can be obtained a sintered alloy of desired density, superior in oxidation resistance, etc.

2 Claims, 2 Drawing Sheets

PROCESS FOR FIRING ALLOYS CONTAINING EASILY OXIDIZABLE ELEMENTS

BACKGROUND OF THE INVENTION

1. Field of the Invention

The present invention relates to a process for firing alloys containing easily oxidizable elements. More particularly, the present invention relates to a process for firing alloys containing easily oxidizable elements such as Al, lanthanides, rare earth elements and the like to obtain a sintered alloy of higher density superior in high-temperature oxidation resistance, etc.

2. Prior Art

In general, sintered alloys such as carbon steel, Fe-Cr stainless steel, Fe-Cr-Ni stainless steel and the like are obtained by firing in hydrogen, dissociated ammonia or vacuum.

As a case in which methane is added to the firing atmosphere, there is reported a process for firing a Fe-2Cu-C steel in $N_2-(1-5)CO-(2-10)H_2-(0.25-0.5)CH_4$ (vol. %) ["Metals Handbook 9th. ed. vol. 7, Powder Metallurgy", pp. 308-376, Am. Soc. for Metals, (1984)].

It was found, however, that a powder of a metal (e.g. Fe-Cr-Al stainless steel) containing easily oxidizable elements, when fired in hydrogen, shows poor sinterability and is unable to achieve a desired density because the oxide film present on the powder particle surfaces, etc. cannot be removed by reduction. In some cases, the easily oxidizable components such as Al and the like are oxidized by a very small amount of oxygen or water contained in hydrogen and are consumed in the course of firing. In any of these cases, the sintered material obtained fails to express desired properties in oxidation resistance, etc.

When the process of conducting firing in $N_2-(1-5)CO-(2-10)H_2-(0.25-0.5)CH_4$ (vol. %) is applied to a Fe-Cr-Al system, aluminum nitride is formed during firing because Al (easily oxidizable element) is reactive also with nitrogen, which prevents achievement of high density. This process is currently in practice in order to obtain a Fe-2Cu-C sintered alloy having a higher hardness at the surface by cementation, and pays no attention to high-temperature oxidation resistance, etc.

The present invention has been made in view of such a situation. The object of the present invention is to obtain a sintered alloy superior in high-temperature oxidation resistance, etc. by, in the process for firing alloys containing easily oxidizable elements, removing the oxidized, layer, the water and oxygen present on the material powder particle surfaces or in the atmosphere used and improving the sinterability of the powder particle surfaces.

As a result of extensive study, the present inventors found that the above object can be achieved by conducting firing in an atmosphere where an appropriate amount of at least one hydrocarbon gas is added to hydrogen gas. The finding has led to the completion of the present invention.

SUMMARY OF THE INVENTION

According to the present invention, there is provided a process for firing alloys containing easily oxidizable elements, which comprises firing a shaped material comprising powders of alloys containing easily oxidizable elements, in a hydrogen-based atmosphere containing at least one hydrocarbon gas in a total amount of 0.01-5.0 volume %.

DETAILED DESCRIPTION OF THE INVENTION

In the present process, alloys containing easily oxidizable elements are fired in an atmosphere wherein hydrogen gas (a base gas) contains at least one hydrocarbon gas in a total amount of 0.01-5.0 volume %, preferably 0.1-5.0 volume %, whereby a sintered alloy of desired density superior in oxidation resistance, etc. can be obtained. The reason why such a sintered alloy is obtained, is presumed to be that the amount of oxides formed on the particle surfaces of raw material powders is reduced and the mutual diffusion of elements is improved.

In the present process, as the hydrocarbon gas, there can be preferably used $C_nH_{2n+2}$ gases (n=1-4) such as methane, ethane, propane, butane and the like, and $C_mH_{2m}$ (m=2-4) such as ethylene and the like. The use of a $C_LH_{2L-2}$ gas (e.g. acetylene), cyclohexane, benzene, toluene or the like gives a similar satisfactory effect.

For example, when methane gas (a $C_nH_{2n+2}$ gas) is used, the effect is expressed by the following formulas 1 and 2.

Formula 1 $CH_4 \rightleftarrows C^* + 2H_2$ ($C^*$: atomic carbon)

Formula 2 $C^* + (O) \rightarrow CO$ (O): Oxygen in the oxide
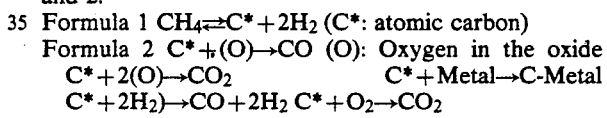

That is, the reactive atomic carbon generated by formula 1 sticks on the surfaces of individual metal particles, allowing reduction and removal of oxidized layer, the metal particles to have a lower melting point, or higher sinterability, achieves easier mutual diffusion of powder particles, and removes very small amounts of the water and oxygen present on metal particle surfaces or in hydrogen gas, promoting a higher density.

For example, when ethylene gas (a $C_mH_{2m}$ gas) is used, or when acetylene gas (a $C_LH_{2L-2}$ gas) is used, or when benzene gas (an aromatic hydrocarbon gas) is used, the atomic carbon generated by the following formula 3, 4 or 5, respectively, is used for the reactions of the above formula 2.

Formula 3 $C_2H_4 \rightleftarrows 2C^* + 2H_2$

Formula 4 $C_2H_2 \rightleftarrows 2C^* + H_2$

Formula 5 $C_6H_6 \rightleftarrows 6C^* + 3H_2$

In the present invention, the total amount of at least one hydrocarbon gas is 0.01-5.0 volume %, preferably 0.1-5.0 volume %. The reason is as follows. When the amount is less than 0.01 volume %, no effect is obtained. When the amount is more than 5.0 volume %, the degree of cementation for metal particles is too high, whereby too low a melting point is invited, deformation by firing is incurred, and the oxidation resistance and corrosion resistance of sintered material are insufficient.

In the present invention, it is preferable that the amount of hydrocarbon gas be not kept constant during the firing step but be changed with the change of heating temperature and the progress of firing. The relation between heat pattern and amount of hydrocarbon gas preferable for the present invention is explained with reference to the accompanying drawings.

Figure 1:
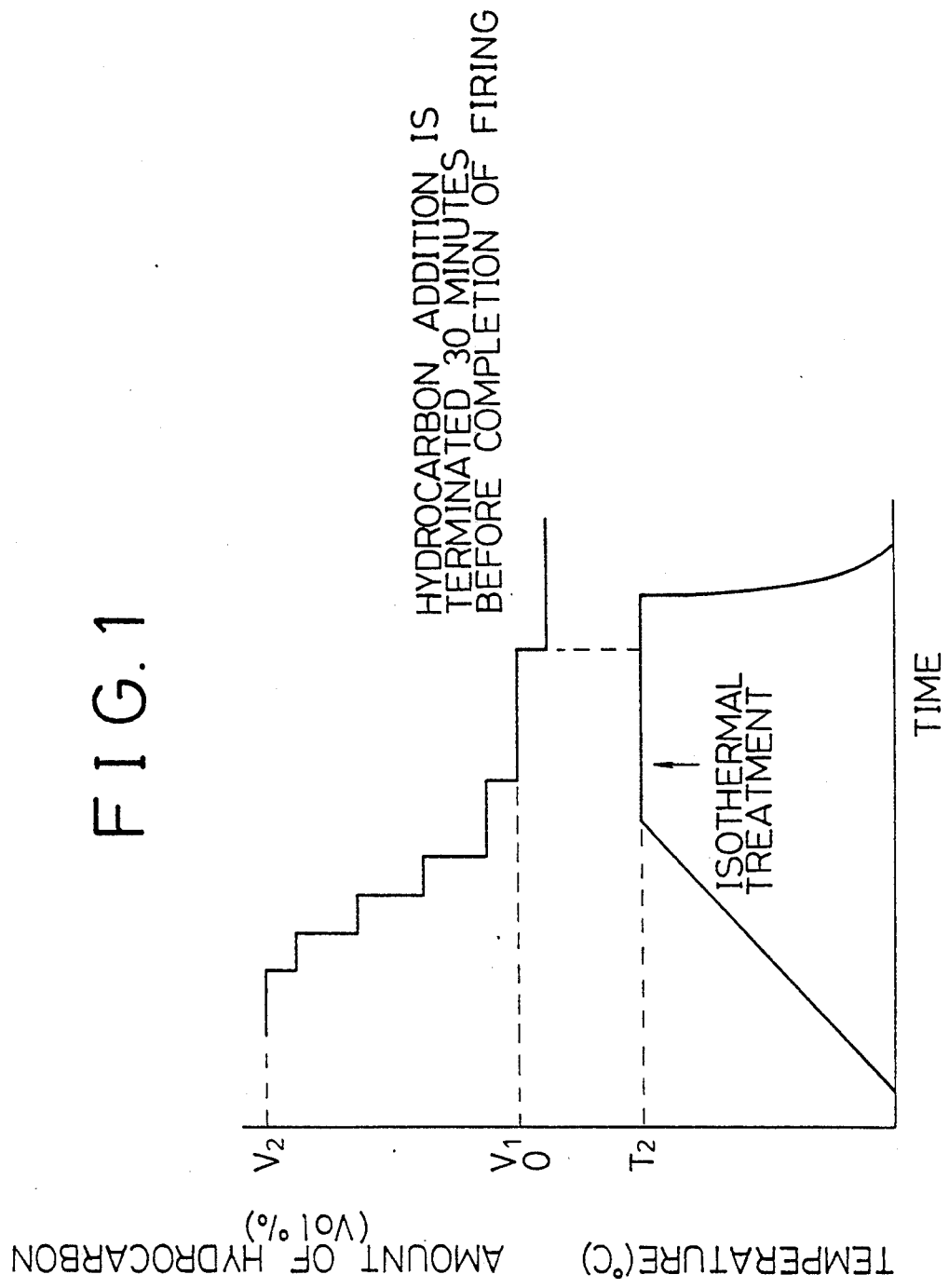
FIG. 1 is a graph showing an example of the relation between heat pattern and amount of hydrocarbon, preferable for the present invention.

FIG. 1 illustrates a case of firing a shaped material which has been subjected to debinding. In this case, a hydrocarbon gas is added in a largest amount $V_2$ at the starting of firing. The reason is as follows. When the hydrocarbon gas is included before the shaped material starts to become more dense, the hydrocarbon gas can act on the surfaces of individual particles of the shaped material, whereby the oxides on said surfaces can be removed or reduced effectively and further the sintering of said surfaces is improved owing to the sticking of atomic carbon thereto, making easy the mutual diffusion between particles.

Meanwhile, when tile hydrocarbon gas is included excessively after the shaped material has started to become more dense, there take place deformation by firing and property deterioration in the vicinity of the sintered material surface, causing deterioration of oxidation resistance and corrosion resistance. Hence, it is preferable that the amount of hydrocarbon gas be gradually reduced from the time when the shaped material has started to become more dense. It is also preferable that the addition of hydrocarbon is reduced to a lowest volume $V_1$ as shown in FIG. 1 when the shaped material has reached a temperature $T_2$ ($T_2$ is a temperature at which the addition of hydrocarbon gas is terminated, and $T_2$ is normally a firing temperature but $T_2$ may be a temperature below the firing temperature.) and that the addition of hydrocarbon gas be terminated 30 minutes before the substantial completion of firing.

Hydrocarbon at high temperatures has a large effect even if the amount is small. From this standpoint also, reduction of amount of hydrocarbon at high temperatures is preferable. The large effect shown at high temperatures is presumed to be because equilibrium reactions such as formulas 1, 3, 4 and 5 proceed to the right side in a higher extent at higher temperatures and reactive atomic carbon is generated in a larger amount.

Figure 2:
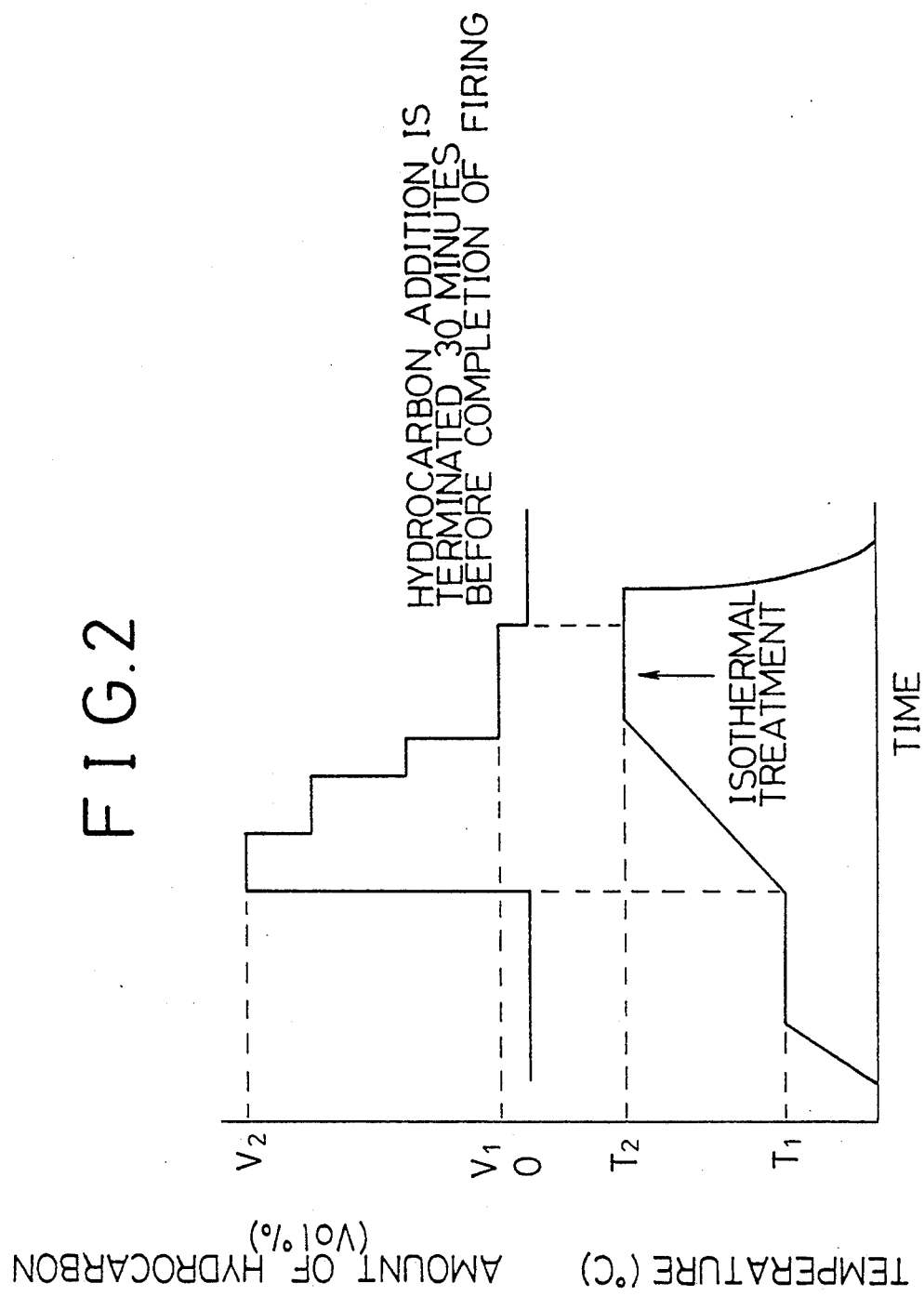
FIG. 2 is a graph showing another example of the relation between heat pattern and amount of hydrocarbon, preferable for the present invention.

FIG. 2 illustrates a case of conducting a debinding step and a firing step continuously for a shaped material. $T_1$ is a temperature required for the debinding of shaped material in the debinding step (generally 500°–800° C.) and also a temperature at which the addition of hydrocarbon gas is started in the firing step. That is, $T_1$ is kept constant until the debinding of shaped material is over and, when the debinding is over, the addition of hydrocarbon gas is started. The subsequent step is the same as in FIG. 1.

In the present invention, it is required that the alloys to be sintered contain easily oxidizable elements such as Al lanthanides, rare earth elements and the like. Other components to be contained in the alloy have no restriction and may be at least one selected from Fe, Cr, Ni, Co, Si, Nb, Mn, V, Mo, Pt, Pd, Rh, B, C, O, etc. Fe-Cr alloys, etc. containing no easily oxidizable element can be sufficiently sintered in hydrogen and, when the present firing process is applied thereto, there arise increase in carbon amount and deterioration of corrosion resistance.

The present invention is hereinafter described in more detail with reference to Examples. However, the present invention is by no means restricted to these Examples.

EXAMPLES 1-4, COMPARATIVE EXAMPLES 1-4

There were mixed a Fe powder, a Cr-Al powder, a Fe-Al powder, a Fe-B powder, a $Y_2O_3$ powder, an organic binder, a lubricant and water so as to give a composition of Fe-12Cr-10Al-0.05B-0.2$Y_2O_3$. The mixture was subjected to extrusion through a die to obtain honeycomb shaped materials of 120 mm in diameter and 50 mm in length having a cell wall of 0.12 mm in thickness and a cell density of 500 cells/inch$^2$. The honeycomb shaped materials were fired under the conditions shown in Table 1. The fired materials were observed or measured for presence of deformation by firing, shrinkage ratio, porosity, oxidation resistance (weight increase per unit surface area after heating in air at 1,175° C. for 72 hours) and corrosion resistance (weight decrease per unit surface area after dipping in a 0.1N aqueous HCl solution for 1 hour). The results are shown in Table 1. In Table 1, heat pattern A indicates a heat pattern of one-trapezoid shape as shown in FIG. 1, that is, a heat pattern when debinding has been conducted before firing; heat pattern B indicates a heat pattern of a two-trapezoid shape as shown in FIG. 2, that is, a heat pattern when debinding and firing have been conducted continuously. Shrinkage ratio was determined using the following equation 1.

Equation 1

Shrinkage ratio in firing $= [(L_0-L_1)/L_0] \times 100$ (%)
wherein $L_0$ is a length of shaped material and $L_1$ is a length of a fired material.

EXAMPLES 5 and 6

Two honeycomb shaped materials were formed in the same manner as in Examples 1–4 and Comparative Examples 1–4 except that the materials powders, the organic binder, the lubricant and water were mixed so as to give a composition of Fe-12Cr-10Al-0.015B-0.5$Y_2O_3$. The shaped materials were fired under the conditions shown in Table 2. The fired materials obtained were observed and measured in the same manner as in Examples 1–4 and Comparative Examples 1–4. The results are shown in Table 2.

EXAMPLES 7 and 8

Two honeycomb shaped materials were formed in the same manner as in Examples 1–4 and Comparative Examples 1–4 except that there were mixed a Fe powder, a Cr-Al powder, a Fe-Al powder, a $Y_2O_3$ powder, an organic binder, a lubricant and water so as to give a composition of Fe-12Cr-10Al-0.5$Y_2O_3$. The shaped materials were fired under the conditions shown in Table 2. The fired materials obtained were observed and measured in the same manner as in Examples 1–4 and Comparative Examples 1–4. The results are shown in Table 2.

EXAMPLES 9 and 10

There were mixed a Fe powder, a Cr powder, a Fe-Al powder, a Fe-Si powder, a Fe-B powder, a $Y_2O_3$ powder, an organic binder, a lubricant and water so as to give a composition of Fe-20Cr-5Al-1Si-0.03B. The mixture was subjected to extrusion through a die to obtain honeycomb shaped materials of 100 mm in diameter and 30 mm in length having a cell wall of 0.2 mm in thickness and a cell density of 300 cells/inch$^2$. The shaped materials were dried and then fired under the conditions shown in Table 2. The resulting fired materials were observed and measured in the same manner as in Examples 1–4 and Comparative Examples 1–4. The results are shown in Table 2.

EXAMPLE 11

There were mixed a Fe powder, a Fe-Al powder, an organic binder, a lubricant and water so as to give a composition of Fe-20Al. The mixture was subjected to extrusion through a die to obtain a honeycomb shaped material of 60 mm in diameter and 120 mm in length having a cell wall of 0.1 mm in thickness and a cell density of 400 cells/inch$^2$. The shaped material was dried and then fired under the conditions shown in Table 2. The resulting fired material was observed and measured in the same manner as in Examples 1–4 and Comparative Examples 1–4. The results are shown in Table 2.

COMPARATIVE EXAMPLES 5 and 6

Two honeycomb shaped materials were formed in the same manner as in Examples 9 and 10 except that there were mixed a Fe powder, a Fe-Cr powder, an organic binder, a lubricant and water so as to give a composition of Fe-18 Cr. The shaped materials were fired under the conditions shown in Table 2. The fired materials obtained were observed and measured in the same manner as in Examples 1–4 and Comparative Examples 1–4. The results are shown in Table 2.

As is clear from Tables 1 and 2, each of the sintered materials obtained in Examples 1-11 showed good properties. In contrast, the sintered material of Comparative Example 1 obtained by firing in hydrogen gas alone, the sintered material of Comparative Example 2 obtained by firing using, as a base gas, a mixed gas consisting of 90 volume % of nitrogen and 10 volume % of hydrogen, and the sintered material of Comparative Example 3 obtained by firing using an insufficient amount of methane gas, were very poor in porosity, oxidation resistance and corrosion resistance. The sintered material of Comparative Example 4 obtained by firing using an excessive amount of methane gas was poor in oxidation resistance and corrosion resistance, showed large deformation by firing, and was impossible to measure shrinkage ratio by firing.

As is clear from the results of Comparative Examples 5 and 6, in the shaped material containing no easily oxidizable element, firing was conducted satisfactorily in an atmosphere containing hydrogen gas alone but, when firing was conducted according to the present process, the resulting sintered material had poor corrosion resistance and showed deformation by firing.

As described above, in the present process, the amount of oxides formed on the surfaces of material powder particles is reduced, and the sinterability of powder particle surfaces is improved owing to the sticking of atomic carbon thereto and thereby the mutual diffusion of powder particles becomes easy. As a result, there can be obtained a sintered alloy of desired density, superior in oxidation resistance, etc.

TABLE 1

|  | Example | | | | Comparative Example | | | |
| --- | --- | --- | --- | --- | --- | --- | --- | --- |
|  | 1 | 2 | 3 | 4 | 1 | 2 | 3 | 4 |
| Conditions of Firing | | | | | | | | |
| Added gas | Methane | Methane | Methane | Methane | No addition | Methane | Methane | Methane |
| Base gas | Hydrogen | Hydrogen | Hydrogen | Hydrogen | Hydrogen | Nitrogen 90* Hydrogen 10* | Hydrogen | Hydrogen |
| Added volume $V_2$ (vol %) | 0.4 | 3 | 4 | 4 | 0 | 0.1 | 0.009 | 10 |
| $V_1$ (vol %) | 0.1 | 0.1 | 2 | 2.8 | 0 | 0.5 | 0.005 | 10 |
| $T_1$ (°C.) |  |  | 700 | 700 |  |  |  | 700 |
| $T_2$ (°C.) | 1,350 | 1,350 | 1,350 | 970 |  | 1,350 | 1,350 | 1,350 |
| Heat pattern | A | A | B | B | A | A | A | B |
| Firing temp. (°C.) | 1,350 | 1,350 | 1,350 | 1,350 | 1,350 | 1,350 | 1,350 | 1,350 |
| Firing time (hr.) | 2 | 2 | 2 | 2 | 2 | 2 | 2 | 2 |
| Properties of Sintered Material | | | | | | | | |
| Deformation by firing | None | None | None | None | None | None | None | High |
| Shrinkage ratio (%) | 17.6 | 19.4 | 20.6 | 19.7 | 14.5 | 7.4 | 14.5 | Impossible to measure |
| Porosity (%) | 3 | <1 | <1 | <1 | 14 | 38 | 13 | <1 |
| Oxidation resistance (mg/cm$^2$) | 1.2 | 0.8 | 2.5 | 0.8 | 6.3 | >10 | 6.2 | 5.3 |
| Corrosion resistance (mg/cm$^2$) | 0.01 | <0.01 | 0.2 | <0.01 | 0.8 | >1 | 0.8 | 0.77 |

*Unit: % by volume

TABLE 2

|  | Example | | | | | | | Comparative Exam. | |
| --- | --- | --- | --- | --- | --- | --- | --- | --- | --- |
|  | 5 | 6 | 7 | 8 | 9 | 10 | 11 | 5 | 6 |
| Conditions of Firing | | | | | | | | | |
| Added gas | Methane | Methane | Methane | Methane | Methane | Methane | Methane | Not Added | Methane |
| Base gas | Hydrogen | Hydrogen | Hydrogen | Hydrogen | Hydrogen | Hydrogen | Hydrogen | Hydrogen | Hydrogen |
| Added volume | | | | | | | | | |
| $V_2$ (vol %) | 0.4 | 3 | 0.4 | 3 | 1 | 5 | 2 | 0 | 4 |
| $V_1$ (vol %) | 0.1 | 0.1 | 0.1 | 0.1 | 0.2 | 1.5 | 0.1 | 0 | 1 |
| $T_1$ (°C.) |  | 700 | 700 |  | 700 |  |  |  |  |
| $T_2$ (°C.) | 1,375 | 1,375 | 1,400 | 1,400 | 1,350 | 1,350 | 1,250 |  | 1,200 |
| Heat pattern | A | B | B | A | B | A | A | A | A |
| Firing temp. (°C.) Firing, etc. | 1,375 | 1,375 | 1,400 | 1,400 | 1,350 | 1,350 | 1,250 | 1,200 | 1,200 |
| Properties of Sintered Material | | | | | | | | | |

TABLE 2-continued

|  | Example | | | | | | | Comparative Exam. | |
| --- | --- | --- | --- | --- | --- | --- | --- | --- | --- |
|  | 5 | 6 | 7 | 8 | 9 | 10 | 11 | 5 | 6 |
| Deformation by firing | None | None | None | None | None | None | None | None | Seen |
| Shrinkage ratio (%) | 17.5 | 19.5 | 16.0 | 16.7 | 18.0 | 21.6 | 16.7 | 20.9 | 21.9 |
| Porosity (%) | 3.8 | <1 | 5 | 3.1 | 2.2 | <1 | 9 | <1 | <1 |
| Oxidation resistance (mg/cm$^2$) | 1.55 | 1.3 | 2 | 1.8 | 1.4 | 2.1 | 3 | >10 | >10 |
| Corrosion resistance (mg/cm$^2$) | 0.02 | <0.01 | 0.01 | <0.01 | 0.09 | 0.3 | 0.4 | 0.05 | >1 |

What is claimed is:

1. A process for firing an alloy containing an easily oxidizable element selected from Al, lanthanides and rare earth elements other than lanthanides, comprising firing a shaped material comprising powders of alloys containing said easily oxidizable element in an atmosphere consisting essentially of hydrogen and at least one hydrocarbon gas, the total amount of said at least one hydrocarbon gas being 0.01-5.0 volume %.

2. A process according to claim 1, wherein the hydrocarbon gas is a $C_nH_{2n+2}$ gas (n=1-4) or a $C_mH_{2m}$ gas (m=2-4).

* * * * *